United States Patent [19]
Fenster et al.

[11] Patent Number: 4,691,366
[45] Date of Patent: Sep. 1, 1987

[54] IMAGE ENHANCEMENT

[75] Inventors: Paul Fenster, Petach Tikva; Yair Shimoni, Jerusalem, both of Israel

[73] Assignee: Elscint Ltd., Haifa, Israel

[21] Appl. No.: 668,946

[22] Filed: Nov. 7, 1984

[30] Foreign Application Priority Data

Nov. 13, 1983 [IL]  Israel ............................... 70213

[51] Int. Cl.⁴ ............................................. G06K 9/40
[52] U.S. Cl. ..................................... 382/54; 358/166;
358/167; 364/572; 364/724; 364/825; 382/22; 382/50
[58] Field of Search ............................ 382/22, 50, 54; 333/165, 166, 162, 168; 364/572, 724, 825; 358/166, 167

[56] References Cited

U.S. PATENT DOCUMENTS

| | | | |
|---|---|---|---|
| 4,142,211 | 2/1979 | Faroudja | 358/167 |
| 4,352,126 | 9/1982 | Poncin et al. | 358/167 |
| 4,463,381 | 7/1984 | Powell et al. | 358/167 |
| 4,561,022 | 12/1985 | Bayer | 382/54 |
| 4,618,990 | 10/1986 | Sieb, Jr. et al. | 382/22 |

OTHER PUBLICATIONS

Rossi, John P., *SMPTE Journal*, "Digital Techniques for Reducing Television Noise", Mar. 1978, vol. 87, pp. 134–140.

*Primary Examiner*—Leo H. Boudreau
*Assistant Examiner*—Jose L. Couso
*Attorney, Agent, or Firm*—Sandler & Greenblum

[57] ABSTRACT

Image enhancement accomplished by filtering using filters optimally adjusted to system parameters to enhance long edges, attenuate noise and "points" so that the long-edge data normally buried in noise is available and to further enable using low-frequency data.

16 Claims, 9 Drawing Figures

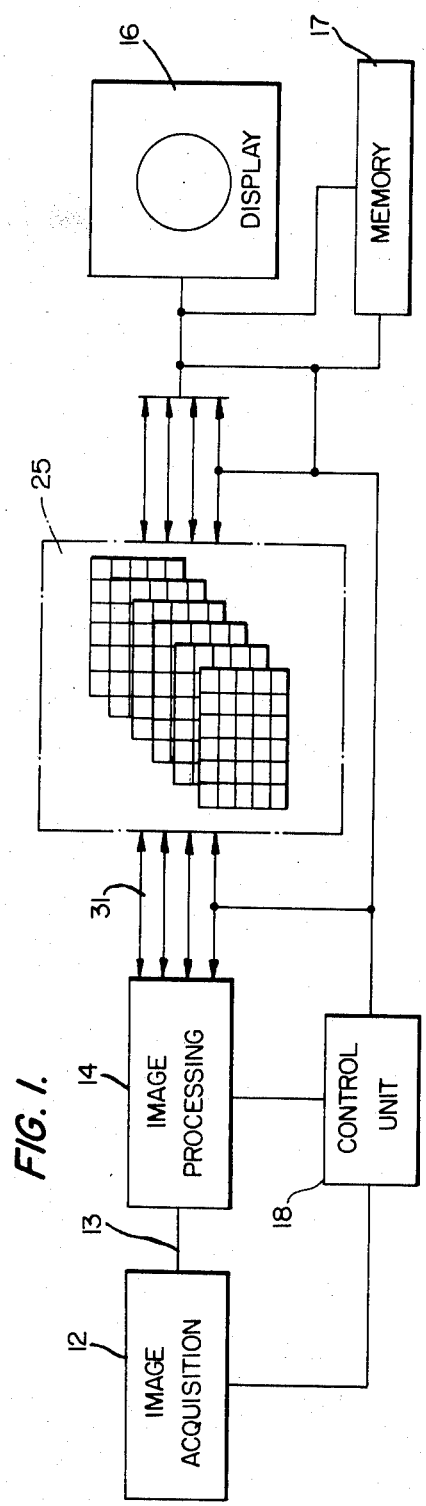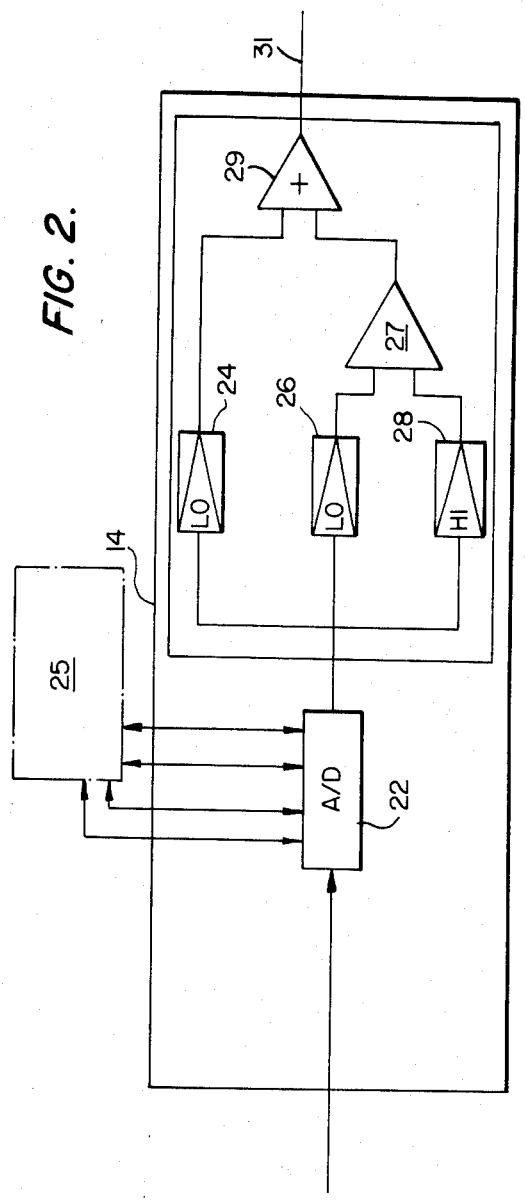

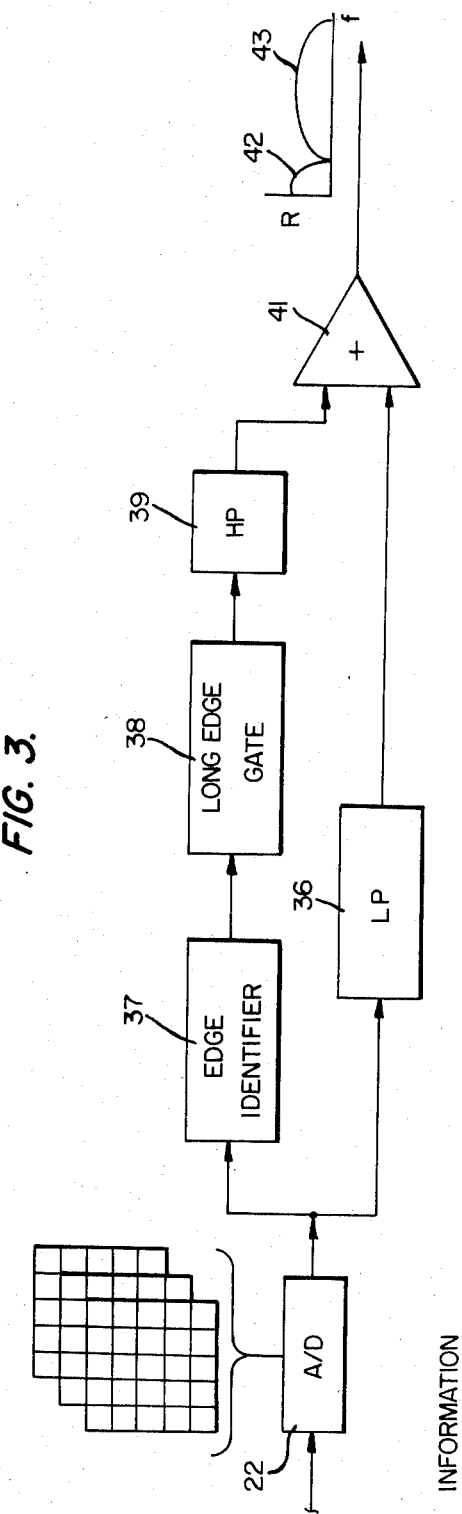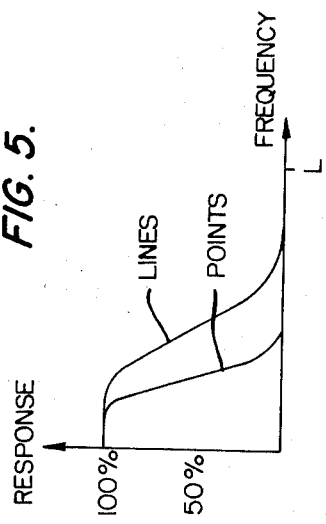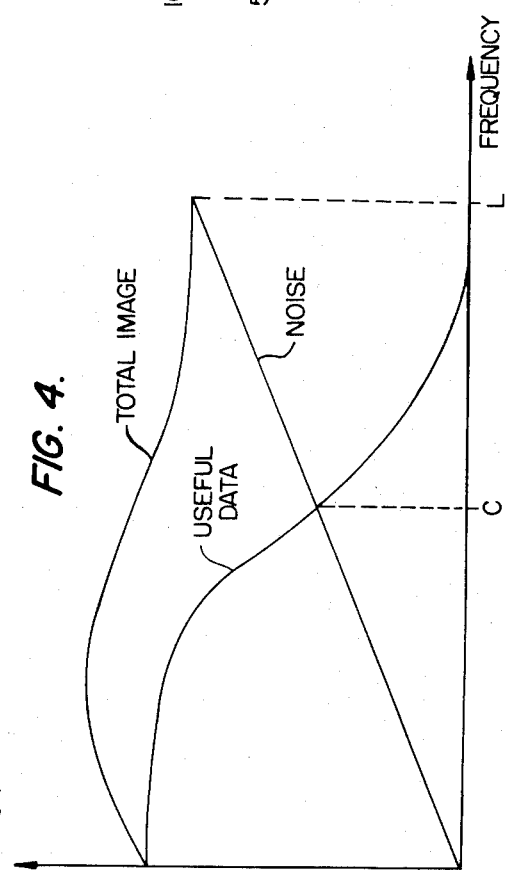

THE FREQUENCY RESPONE OF
A COMBINED FILTER: THAT OF
FIG. 5+10 AND THAT OF FIG. 7.

THE SIGNAL-TO-NOISE RATIO OF THE
DATA OF FIG. 1. BEFORE AND AFTER
FILTRATION (SNR=1 IS LIMIT OF DETECTION)

IMAGE ENHANCEMENT

FIELD OF THE INVENTION

This invention is concerned with image enhancement and particularly with image enhancement in digital fluorographic imaging systems where the data of interest comprises mainly long-edged items.

BACKGROUND OF THE INVENTION

Digital image enhancement is no longer a new field of endeavor, but many long-standing problems remain unsolved. Some of these problems appear inherent and therefore incapable of solution. For example, images contain data on portions of the objects being studied that are of interest, portions of the objects that are not of interest, and noise. Specifically in digital fluorography the images include data on the vascular system that is of interest. Data is also present on portions of the body that are not of interest. Unfortunately, noise is also present in the images. The images are enhanced by filtering and subtraction techniques that are designed to:

1. Remove from the images the portions of the patient's anatomy that are not of interest;
2. Increase the signal to noise ratio (SNR); and
3. Enhance the outlines of the portions of the anatomy that are of interest.

In digital fluorography the removal from the image of portions of the patient's anatomy that are not of interest is accomplished by subtraction or by temporal filtering. The results are images wherein the data of interest comprises mainly long-edged items and noise. The enhancement of the outlines of the portions of the anatomy that are of interest thus involves the enhancement of long edges.

High pass filters enhance transitions. Therefore using a high pass filter on an image will enhance both the edges or outlines of objects and the noise. It should be noted that whereas the "information content" of an image decreases with increasing frequencies, the "noise content" of "white" noise, such as quantum noise (e.g. proton counting errors) is constant with one-dimensional frequencies and rises linearly with two-dimensional frequencies of images. The enhancing filters thus generally are "cut-off" at some frequencies to keep from increasing the noise of high frequencies where there is essentially little or no information.

It is known that the frequency responses of "points" and "lines" are inherently different. Thus the responses of "points" and "lines" to the same filters are different. For example, with "gaussian"-type low-pass filters the cut-off frequency of "points" is lower than the cut-off frequency of "lines". Also the declining slope of the filter response to "points" is steeper than the declining slope of the filter response to "lines". Certain types of high-pass filters such as "gradient-squared"-type filters also exhibit different responses to "points" and to "lines". Here the response to "points" increases linearly at a greater slope vs. frequency than does the response to "lines".

In the past the filters have not been tailored to differentiate and distinguish between "points" (which generally includes noise) and long "lines" or edges—regardless of the orientation of the edges. It is possible to "fine tune" the filters to optimize the parameters so that the points are filtered out and the SNR of the long edges is improved. Such filter optimization has not been accomplished in the prior art filters presently used with digital fluorographic systems.

There is a need for filters in digital fluorographic systems that have parameters optimized to attenuate the "points" and to improve the SNR of long edges. Similarly, there is a need for such filters that will not smear the edges in the images.

BRIEF DESCRIPTION OF THE INVENTION

According to a broad aspect of the invention a method of image enhancement by filtering is provided, said method comprising the steps of:
  acquiring an image in the form of data, said image comprising noise, "points" and edges;
  filtering to attenuate the "points" and the noise relative to the edges; and
  optimally enhancing the long edges.

A feature of the invention is a filter arrangement that increases the SNR of long edges while retaining low frequency signals for smoothing and background.

A further feature of the invention includes the step of "recognizing" the long edges independently of the orientation of the long edges.

BRIEF DESCRIPTION OF THE DRAWINGS

The above-mentioned and other objects and features of the invention will be made clear in the following description of preferred methods and equipment for carrying out the invention taken in conjunction with the accompanying drawings wherein:

FIG. 1 is a generalized block diagram showing of a digital fluorographic system;

FIG. 2 is a block diagram showing of the filter portion of the image processing portion of FIG. 1;

FIG. 3 is a block diagram of another embodiment of the showing of FIG. 2;

FIG. 4 is the frequency spectra of an image;

FIG. 5 is the frequency response of a type of low-pass filter;

GENERAL DESCRIPTION

Figure 6:
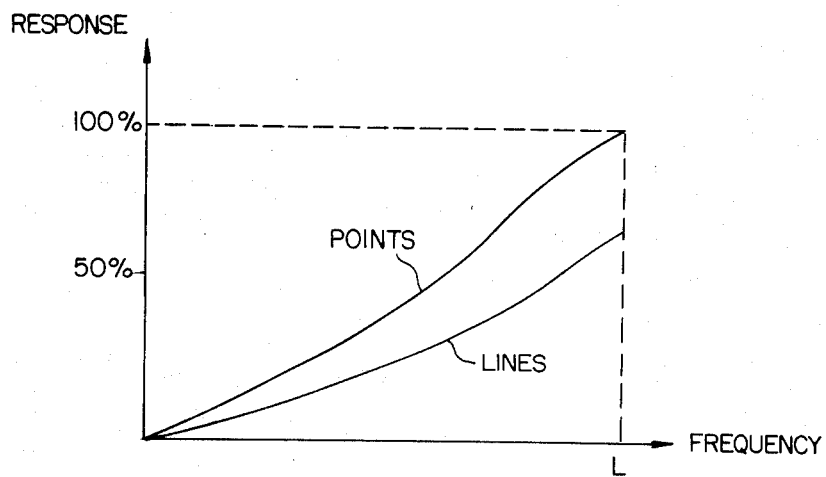
FIG. 6 is the frequency response of a type of high-pass filter.

The image enhancement system 11, shown in FIG. 1 includes image acquisition means 12, which in a DF system includes the X-ray source, an image intensifier and the video cameras. The output of the image intensifier on line 13, is the camera's video signal.

The video signal is processed by the image processing equipment represented by block 14. The output of the processing means 14, is displayed on unit 16, and/or committed to storage in memory 17. The entire system is under the control of control unit 18.

The image-processing equipment for DF systems includes subtraction means (not shown) that usually operates on the data after conversion by analog-to-digital converter means 22. Image enhancement by the methods described herein with high-pass and low-pass filters is shown in FIG. 2 as operating on the digital data. The invention also encompasses filtering analog data. The digital data is kept in matrices shown as 25, of rows and columns which are related to x,y coordinates of the image intensifier target and to the x,y position of the variations in intensity of the displayed image.

The digital data is operated on to enhance the edges in the image by unit 23, which in a preferred embodiment is a combination of filter elements. More particularly, a low-pass filter 24, is provided which is designed to include the low frequency data. A band-pass filter shown as comprising another low-pass filter 26, combined by multiplication in unit 27, with high-pass filter 28 is also used. The output of the multiplier unit is added in unit 29, with the output of low-pass filter 24. The combination of filters at the output 31 of summing unit 29, is noise-filtered, point attenuated, edge-enhanced output data wherein smearing of long edges is minimized.

FIG. 3 is a more generic showing of the invention. Therein the output of the analog to digital converter is transferred to a low-pass filter 36, and to an edge identifying unit 37. Gradients may be used to recognize and identify edges. Only the recognized edges that are long are passed by long-edge gate 38.

These recognized long edges are then sent through the high-pass filter 39, for enhancement. The edge-identifier and long-edge gate, in a preferred embodiment, are comprised of a "gradient-squared"-type filter, which is a high-pass filter such as filter 39, and which operates with a gaussian filter 39 which is a low-pass filter similar to filter 36 to produce a band-pass responsive, with the cut-off adjusted to provide a band wherein the long "lines" are enhanced and the hf noise and "points" are attenuated.

The low-pass filter 36 assures the passage of the low-frequency data signals. The edges are determined by a threshold gradient and long edges are those that are at least two pixels in length in any direction in accordance with one aspect of the invention.

The outputs of the low- and high-pass filters are combined by summing unit 41. The output of unit 41 is shaped as shown in FIG. 3. The low-pass filter provides the output of portion 42. The gradient squared filter and the low-pass Gaussian filter of the "edge" circuits 37 and 38 in combination with high-pass filter filter 39 provide the characteristics output curve of response R versus frequency 43.

FIG. 4 is a schematic drawing of the spectra within an image. The letter "L" shows the Lyndquist limit frequency (2 pixels per cycle in a preferred embodiment). The letter "C" indicates the frequency at which the data and the noise are equal in average amplitude. Data at frequencies higher than "C" is said to be "buried" in the noise. FIG. 5 schematically shows the responses of "points" and "lines" to the operation of a low-pass filter on the image data. "Response" as used herein means the ratio between the average amplitude at the specified frequency after the filtration to the average amplitude at the same frequency prior to filtration. "Frequency" here means frequency per width or the typical frequency across points and lines. With points it is the frequency per diameter, and with lines it is the frequency width of the line. The two different curves are the responses of the different types of objects to the same filter.

FIG. 6 shows the responses of "points" and "lines" in the presence of a high-pass filter. One has control, through the filter parameters, over the shape of the filter as given, for example, by the 50% frequency, the slope at the 50% frequency, the 5% and 15% frequencies etc. Band-pass filters are created through the use of both high-pass and low-pass filters, one after the other (order is not important). By choosing appropriate low-pass and high-pass filters a "band-pass" filter is formed with the desired shape as given, for example, by its maximum frequency, its half-maximum frequencies etc.

The three filter types operate differently on "point"-type objects and on "line"-type objects. This is easiest to see for a "separable" filter whose operation can be separated into the operation of a one-dimensional filter twice, once in one direction an once in the orthogonal direction.

If for the given frequency the one-dimensional response in $R_1(f)$, the "point" response to the two-dimensional filter will be $R_P = R_1(f)^2$, while the "line" response will be $R_L = R_1(O) \cdot R_1(f)$. For a low-pass filter $R_1(O) = 1$ and therefore $$R_P(f) = R_L(f)^2.$$

However, other filters may also be used to obtain a bank within which the "points" and noise are attenuated relative to the "lines". For example, the "gradient square" operator has a frequency response of $$R_P(f) = 2f^2 A^2$$

for a point, and $$R_L(f) = f^2 A^2$$

for a line. Thus, $$R_P(f) = 2 \cdot R_L(f).$$

See FIG. 6.

It can be seen that the band-pass filter created by "gradient" filters has different properties for "points" and "lines". For example, if the high-pass filter is "the gradient squared".

$$R_{BP}(\text{points}) = 2 \cdot R_1(f)^2 \cdot f^2 \cdot A^2$$

$$R_{BP}(\text{lines}) = R_1(f) \cdot f^2 \cdot A^2$$

and therefore the maximum response of the band-pass filter occurs where $$dR_L/df = -R_1/f \text{ for points}$$

but where $$dR_1/df = -2R_1/f \text{ for lines.}$$

For example, if R is a Gaussian-like function:

$$R_1 = \exp[-f^2/B]$$

then the maximum for "points" would occur at $$f\text{max (points)} = \sqrt{B/2}$$

and for "lines", at $$f\text{max (lines)} = \sqrt{B}$$

and the values at maximum would be $$R\text{max} = A \exp[-1] \text{ for "points"}$$

and $$R_{max} = A \exp[-1] \text{ for "lines"}.$$

Figure 7:
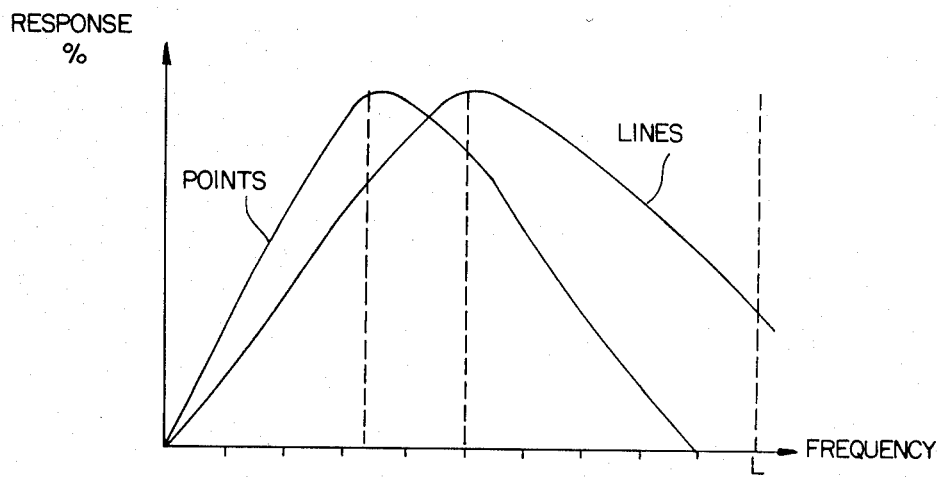
FIG. 7 is the frequency response of a band-pass filter.

The highest values of both the "points" and the "lines" curves are identical, but the locations are different. See FIG. 7.

The above examples show that it is possible to create band-pass filters that will selectively enhance "line" objects over "point" objects.

It must be noted that noise, being haphazard, is always a "point" object. The data of interest, however, may be, and usually is, of a different nature is different types of studies. Images is astronomy, for example, and many types of images in nuclear medicine, are also of a "point" nature. For such images there is no filter possible which changes the signal-to-noise ratio at a given frequency. It is only possible in such images to enhance certain frequencies (data and noise together) relative to others. In digital fluorography and similar fields, however, band-pass filters can be optimised to work on the frequency region where the data is already "buried" in the noise and thus enhance the data, which is of "line" type, relative to the noise to such extent that it is no longer "buried".

In order to maintain the fidelity of the image the result of the band-pass filtration may be added to a low-pass filtration of the image. So the large features will appear as they were. The resulting filter response is shown in FIG. 8.

Figure 8:
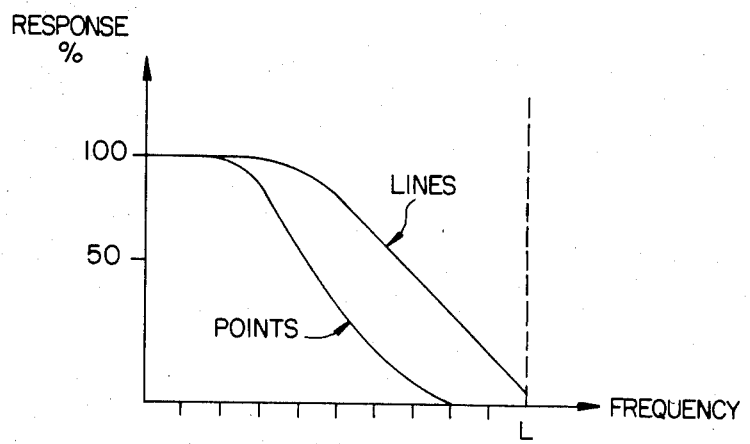
FIG. 8 is the frequency response of a combined filter.
Figure 9:
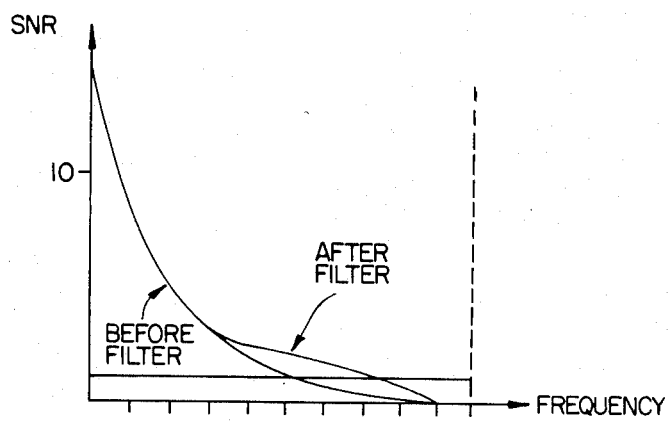
FIG. 9 is the signal-to-noise ratio before and after filtration using the filter of FIG. 8.

FIG. 9 shows an example of the result of filtration, using the filter of FIG. 8 on the data of FIG. 1 and calculating the signal-to-noise ratio (SNR) before and after filtration. It is clear that the region between 0.6L to 0.78L was "buried in noise" before filtration but is now observable. In the region from 0.3L to 0.6L there is noticeable improvement in the SNR. The region below 0.3L has no noticeable improvement in the SNR, and the region above 0.78L is still "buried in noise" despite the improvement.

The above are examples of a filter to improve data such as gathered by the equipment depicted in FIG. 1. Each digital fluorography (DF) image has a filter that will improve it, and there are filters that will improve a given class of DF images (defined by dosage, object imaged etc.) or even a number of classes.

In operation, the DF image data is acquired when the X-rays passing through a subject are detected and activate the target of an image intensifier. Responsive to the activation and operation of an image intensifier, a video camera provides video signals. The video signals are converted to digital signals which are operated on to detect and enhance long edges while reducing the noise without smearing the enhanced long edges. The filter parameters are selected to enhance the particular data or class of data.

The detection and enhancement of the long edges with the minimization of edge smearing can be shown mathematically:

Improved image = [Low-pass $f$ + band-pass $f$] Image

Improved Image = $[S(\alpha_1) + \beta S(\alpha_2)|\nabla|^2]$ · Image where:
 $\alpha$ is the low-pass filter frequency (as $\alpha$ increases there is less smearing in the smoothing function),
 $\beta$ is a scaling factor which must be optimized (as $\beta$ increases there is more edge enhancement),
 $\nabla$ is the gradient operator, $|\nabla|^2$ is the gradient's squared amplitude operator.

Note that the band pass filter function includes a gradient term for edge recognition. In effect the band-pass function includes a low-pass filter and a gradient amplitude squared. Other methods can be used to obtain similar results.

While the invention has been described with relation to specific embodiments, it must be emphasized that the embodiments are used merely by way of example and in no way limits the scope of the invention which is defined in the appended claims.

What is claimed is:

1. A method using filtering for image enhancement in digital fluorography, said method comprising the steps of:
 (a) acquiring an image that comprises data of interest, data not of interest, and noise; said data of interest being amplitudes of edges having a finite linear dimension of at least two pixels, said noise having amplitudes with an average at a certain frequency that is substantially equal to an average amplitude of said edges, the average amplitude of the noise at frequencies higher than said certain frequency being higher than the average amplitude of said edges, and the average amplitude of the noise at frequencies lower than said certain frequency being lower than the average amplitude of said edges, said edges being enhanced at said higher frequencies;
 (b) determining system parameters that effect filter optimizing procedures;
 (c) using the system parameters to provide filter means that have different frequency responses to said data of interest than to said data not of interest or said noise; and
 (d) filtering with said filter means to increase said certain frequency and thereby optimally enhance the data of interest and attenuate the data not of interest and the noise relative to the data of interest.

2. The image enhancement method of claim 1 wherein said data not if interest includes "points" and wherein said filtering comprises a first high-pass filtering step to distinguish the differences in frequency response between said edges and said "points" and to enhance the edges, said method including the further step of cutting off said high-pass filtering to obtain a frequency band where the average of the amplitude values of the edges are relatively high values, the average amplitude of said noise and "points" are relatively low values, said frequency band occurring at frequencies wherein the average amplitude values of the noise are normally higher than the average of the amplitude values of the edges.

3. The image enhancement method of claim 2 including a first low-pass filtering step to obtain low-frequency data in addition to the enhanced edges.

4. The image enhancement method of claim 3 wherein the first high-pass filter step includes "gradient-squared" filtering.

5. The image enhancement method of claim 4 wherin cutting-off of the high-pass filtering comprises a first low-pass filtering step in combination with said "gradient-squared" filtering.

6. The image enhancement of claim 5 including a second low-pass filtering step to obtain low-frequency data.

7. The image enhancement method of claim 6 wherein said first low-pass filtering step comprises "gaussian" filtering.

8. The image enhancement method of claim 7 wherein said second low-pass filtering step comprises "gaussian" filtering.

9. A system for digital fluorographic image enhancement, said system including:
(a) means for acquiring an image that comprises, data of interest, data not of interest, and noise, said data of interest being amplitude values of edges of blood vessels, said noise having an average amplitude at a certain frequency that is substantially equal to an average of the amplitude values of the edges, the average amplitude value of said edges being higher than the average amplitude of the noise at frequencies lower than said certain frequency, the average amplitude value of said edges being lower than the average amplitude of said noise at frequencies higher than said certain frequency, said edges having the characteristic of being enhanced at frequencies higher than said certain frequency;
(b) means for determining system parameters that effect filter optimizing procedures by increasing said certain frequency; and
(c) filter means using said determined system parameters to provide different frequency responses to said data of interest than to said data not of interest or said noise for filtering the acquired data to increase said certain frequency and to thereby optimally enhance the edges and to attenuate the data not of interest and the noise relative to the edges.

10. The image enhancement system of claim 9 wherein the data not of interest include points and wherein said filter means comprise:
first high-pass filter means which distinguishes differences in frequency response between said edges and said points and which enhances the long edges;
means for cutting off said first high-pass filter means to obtain a first frequency band wherein the average amplitude value of the edges are higher than the average amplitude values of the "points", and said first frequency band occurring at frequencies where the average amplitude values of the noise are normally higher than the average of the amplitude values of the edges.

11. The image enhancement system of claim 10 including a first low-pass filter means set to obtain low-frequency data in addition to the enhanced edges.

12. The image enhancement means of claim 10 including first high-pass filter means which comprises "gradient squared" filter means.

13. The image enhancement system of claim 12 wherein the means for cutting of said first high-pass filter means comprise a second low-pass filter means operating in combination with said 'gradient'-squared filter means.

14. The image enhancement system of claim 13 wherein said second low-pass filter means has a cut-off frequency below the cut-off frequency of said first low-pass filter means to pass low-frequency data.

15. The image enhancement system of claim 14 wherein said first low-pass filter means comprises "gaussian" filter means.

16. The image enhancement system of claims 14 or 15 wherein said second low-pass filter means comprises "gaussian" filtering means.

* * * * *